United States Patent [19]

Huempfner et al.

[11] 4,254,928

[45] Mar. 10, 1981

[54] STABILIZED ELEVATOR FOR STRETCHER OR THE LIKE

[75] Inventors: David F. Huempfner; Douglas A. Rippe; Robert E. Martin, all of Two Rivers, Wis.

[73] Assignee: American Hospital Supply Corporation, Evanston, Ill.

[21] Appl. No.: 19,042

[22] Filed: Mar. 9, 1979

[51] Int. Cl.³ ............................................ F16M 13/00
[52] U.S. Cl. ........................................ 248/422; 5/63; 108/147
[58] Field of Search ............... 248/422, 406, 188.5, 248/162.1; 5/63, 11; 254/97; 108/2, 6, 147; 74/29, 30

[56] References Cited

U.S. PATENT DOCUMENTS

| | | | |
|---|---|---|---|
| 1,243,750 | 10/1917 | Miller | 108/147 |
| 1,289,436 | 12/1918 | Gardner | 74/30 |
| 1,645,908 | 10/1927 | Hutchins | 5/63 X |
| 2,353,716 | 7/1944 | Estey et al. | 74/29 X |
| 3,472,488 | 10/1969 | Naughton | 108/147 X |
| 3,585,875 | 6/1971 | Adams | 74/29 X |
| 3,707,930 | 1/1973 | Yindra | 108/147 |
| 3,888,444 | 6/1975 | Yindra | 248/188.5 |
| 3,940,808 | 3/1976 | Petrini | 5/86 |
| 3,989,211 | 11/1976 | Gunolach | 248/162.1 |

FOREIGN PATENT DOCUMENTS 1419 of 1885 United Kingdom .......................... 5/63

*Primary Examiner*—J. Franklin Foss
*Attorney, Agent, or Firm*—Larry N. Barger

[57] ABSTRACT

An elevator for raising and lowering a hospital stretcher or the like without binding. The stabilized elevator has a pair of intermeshed timing gears at each end of the elevator which are connected by horizontal axles that are rotationally secured to a first telescoping section of the elevator. Each timing gear intermeshes with a vertical toothed rack secured to a second telescoping section adjacent each gear. The intermeshing timing gears and racks cooperate to keep the telescoping elevator from binding, particularly when the stretcher or the like has a heavier load at one end than the other.

21 Claims, 4 Drawing Figures

U.S. Patent  Mar. 10, 1981  4,254,928
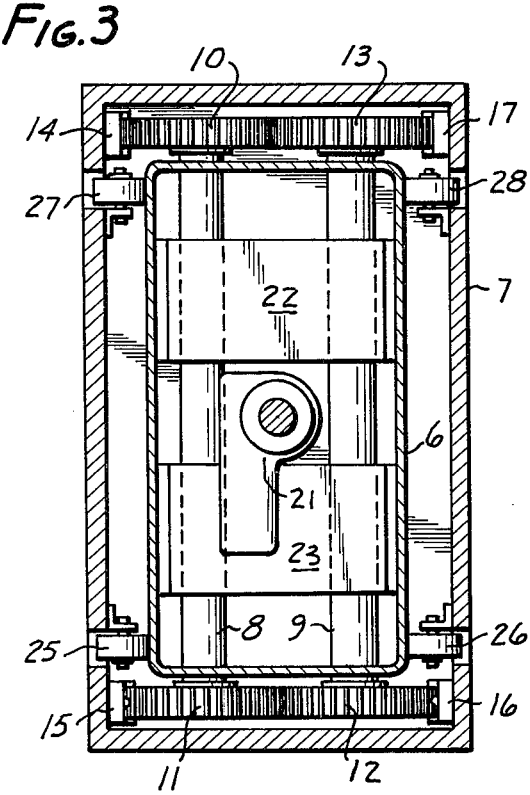
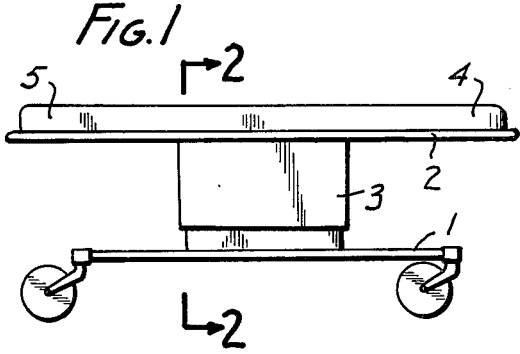
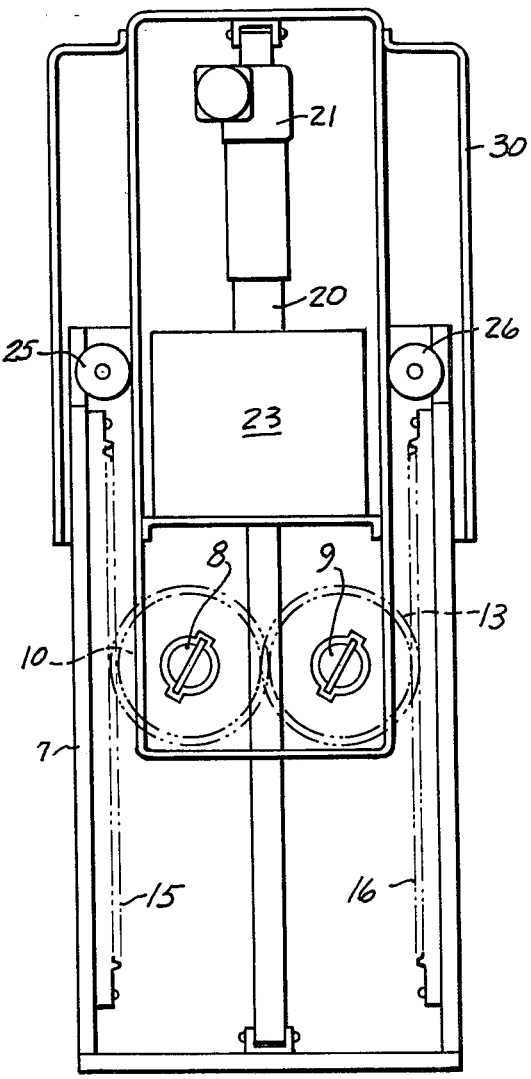
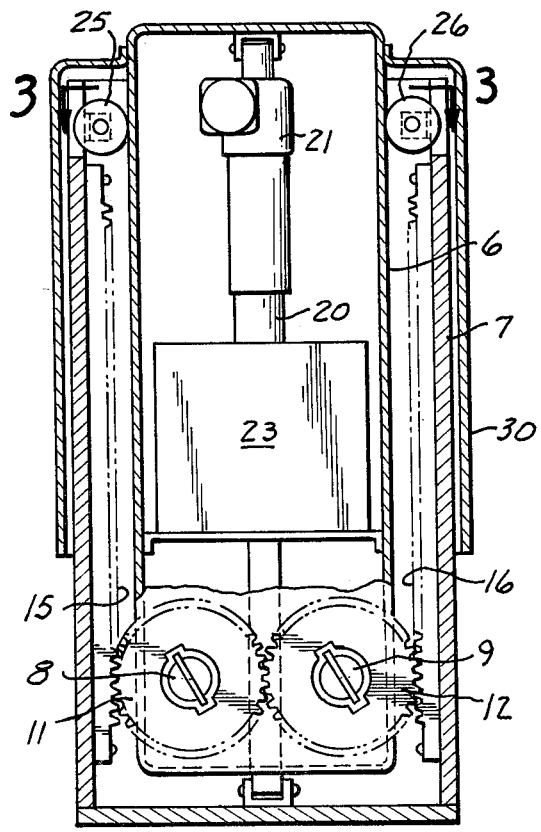

STABILIZED ELEVATOR FOR STRETCHER OR THE LIKE

BACKGROUND

It is known to have power elevators on hospital stretchers, beds, drafting tables, barber chairs, etc. Examples of such power elevators are U.S. Pat. Nos. 2,592,166; 3,707,930; and 3,888,444. Because of the particular use, many of these elevators are required to have very compact dimensions and often support a cantilevered table similar to the cantilevered structure of an automobile lift used in gasoline stations. Such "central post" elevators provide convenient access about an entire periphery of the table without bumping into corner supports, such as in the four poster bed of U.S. Pat. No. 2,592,166. This is very important in hospital stretchers where nurses and physicians must have easy 360° access around a patient. Also, the cantilevered areas provide easy access to suspended urinary drainage containers and permit other medical carts and equipment to be rolled very close to the stretcher from all directions.

A single center post elevator has practical advantages over 4 widely spaced elevators at corner posts, such as in U.S. Pat. No. 2,592,166. The narrow spindle-like legs of this patent would tend to wobble, and also any torque in the elongated shaft extending the length of the bed and any play in the worm gears could cause uneven vertical motion among the 4 spindle-like legs resulting in binding.

SUMMARY OF THE INVENTION

The present invention overcomes the above problems by providing a compact telescoping elevator system for hospital stretchers or the like which resist binding even when the load is unevenly distributed. The elevator includes a pair of axles rotationally mounted on one telescoping section and the axle set has a pair of gears at each end which intermesh with each other and with vertical toothed racks secured to a second telescopic section. The gears, axles, and racks act as a timing system so both ends of an elevator rise and fall in sequence without binding.

THE DRAWINGS

FIG. 1 is a side elevational view of the hospital stretcher;

FIG. 2 is a sectional view of the stretcher elevator taken along line 2—2 of FIG. 1 showing the elevator in collapsed position;

FIG. 3 is a top sectional view taken along line 3—3 of FIG. 2; and

FIG. 4 is a view similar to FIG. 3, but showing the elevator in partially expanded position.

DETAILED DESCRIPTION

FIG. 1 shows a hospital stretcher with running gear 1 and a mattress support 2 that are vertically separated by an elevator 3. This stretcher structure has a cantilevered head section 4, as well as a cantilevered foot section 5. The sides are also cantilevered beyond elevator 3, but to a lesser extent than the end sections 4 and 5. The stretcher of FIG. 1 is a typical size for a patient and is longer than it is wide, and as shown in this Figure is more than twice as large as the cross-sectional area of the "central post" type elevator column.

The construction of the elevator includes a first section 6 and a second section 7 which are telescopically joined together. Extending longitudinally along the first section 6 are a pair of stabilizing axles 8 and 9 which are rotationally joined to the first section 6. Such rotational connections can be made with bearings which are well-known in the art. As shown, the axles are generally parallel to the stretcher top's longitudinal axis.

These axles 8 and 9 each have a pair of timing gears shown at 10, 11, 12, and 13. Each gear is secured, preferably by pins, to its respective axle. These timing gears intermesh with each other at an area adjacent the rotational connections between shafts 8 and 9 and first section 6. Because of the intermeshing, all 4 gears 10, 11, 12, and 13 simultaneously rotate.

A second or lower section of the elevator 7 has four vertical toothed racks 14, 15, 16, and 17 secured along their lengths to lower section 7 of the elevator and which intermesh with outer edges of the timing gears, as shown in FIG. 2. Thus, as the first section 6 raises and lowers relative to the second section 7, timing gears 10–13 simultaneously rotate along their respective racks 14–17. Because of the intermeshing between the gears, a particular corner or end of the elevator cannot lead or lag the vertical movement of any other corner or end. This provides improved stability to the stretcher, particularly when a patient's body weight has a center of gravity closer to one end of the stretcher. This uneven loading might also occur with various medical equipment temporarily fastened to one end of the stretcher. To insure there is no slippage of the gear teeth, the distance between opposing racks can be accurately adjusted with shims between the racks and second section of the elevator. Typical shims 15a and 17a are shown in FIGS. 2, 3 and 4.

Although intermeshing teeth of the two gears is preferred, the nonbinding effect could also be achieved if wheels with nonslip (untoothed) peripheral portions were used for engagement between the wheels. Also if made with nonslip surfaces, the tracks to engage the wheels could be used without teeth.

Vertical movement between the telescoped sections of the elevator is caused by a centrally located jacking column 20 which has an internal screw jack structure (not shown). A motor 21 drives a threaded screw that is hidden from view by protecting cylindrical shrouds about the screw. With this construction, expensive hydraulic systems are not needed. Motor 21 can be driven by batteries 22 and 23 which are electrically connected to motor 21 by conventional wiring (not shown).

FIG. 2 shows the elevator in its collapsed position while FIG. 4 has the elevator partially extended. For increased stability, particularly as the elevator approaches its uppermost limit, rollers 25 and 26 guide the telescoping sections. Rollers 25 and 26, as well as rollers 27 and 28, help stabilize the elevator against side play of its telescoping sections. Similar rollers could also be used at the end to minimize any end play.

To protect the working mechanism of the elevator from dust, as well as to protect against operator injury from the mechanism, a protector shroud 30 is secured to first section 6. This shroud could have many different details, and is shown only in a general way.

In describing the elevator, the hospital stretcher has been used as an example. However, the central post elevator which is highly stabilized would be useful for other type uses, such as drafting tables, etc. Although a specific example has been used to describe the invention above, it is understood by those skilled in the art that certain modifications can be made to this example without departing from the spirit and scope of the invention.

We claim:

1. A stretcher or the like with a "central post" type elevator column having two intertelescoping sections, and a supporting top on the elevator column that is at least twice as large as the column's cross-sectional area, wherein the improvement comprises: a pair of stabilizing axles rotatably connected to a first intertelescoping section; at least one gear fixed to each axle, and this gear has teeth that intermesh with teeth on the other axle's gear causing the axles to simultaneously rotate; and a pair of toothed tracks, each track being secured along a major portion of its toothed length to a second intertelescoping section so that the teeth of the tracks intermesh with the teeth of the two gears, whereby cocking and binding between the two sections is prevented.

2. A stretcher or the like as set forth in claim 1, wherein there is a generally vertical jacking column independent of the two axles for raising and lowering the elevator.

3. A stretcher or the like as set forth in claim 2, wherein the jacking column includes a screw mechanism.

4. A stretcher or the like as set forth in claim 3, wherein the screw mechanism is actuated by a battery powered motor.

5. A stretcher or the like as set forth in claim 1, wherein there is a plurality of stabilizing rollers at an interface between the two sections.

6. A stretcher or the like as set forth in claim 5, wherein the stabilizing rollers are secured to the second section.

7. A stretcher or the like as set forth in claim 1, wherein the stretcher or the like includes a supporting top with a greater length than width.

8. A stretcher or the like as set forth in claim 7, wherein the axles are generally parallel to the top's length.

9. A stretcher or the like as set forth in claim 1, wherein there is a protector shroud at an interface between the two telescoping sections.

10. A stretcher or the like as set forth in claim 1, wherein the sections are generally rectangular and there are 2 intermeshed gears and 2 racks adjacent opposite ends of the axles.

11. A stretcher or the like as set forth in claim 1, wherein at least one rack has adjustable means to insure proper spacing between opposed racks.

12. A stretcher or the like as set forth in claim 12, wherein the adjustment means includes shims.

13. A "central post" type elevator column having telescoping sections for connecting to a supporting top that is at least twice as large as the column's cross-sectional area, wherein the improvement comprises: a pair of stabilizing axles rotatably connected to a first intertelescoping section; a gear fixed on each axle, and each gear has teeth that intermesh with teeth on the other axle's gear causing the axles to simultaneously rotate; and a pair of toothed tracks, each track being secured along a major portion of its toothed length to a second intertelescoping section so that the teeth of the tracks intermesh with the teeth of the two gears, whereby cocking and binding between the two sections is prevented.

14. A stretcher or the like with a "central post" type elevator column having two intertelescoping sections, and a supporting top on the elevator column that is at least twice as large as the column's cross-sectional area, wherein the improvement comprises: a pair of stabilizing axles connected to a first intertelescoping section; at least one wheel on each axle, and such wheel has a peripheral portion that engages a peripheral portion on the wheel on the other axle causing both wheels to simultaneously rotate; and a pair of tracks, each track being secured along a major portion of its length to a second intertelescoping section so that the tracks can engage peripheral portions of the wheels, whereby cocking and binding between the two sections is prevented.

15. A stretcher or the like as set forth in claim 14, wherein at least one axle is rotatably connected to the first section, and its wheel is fixed to the axle so as to simultaneously rotate with such axle.

16. A stretcher or the like as set forth in claim 15, wherein both axles are rotatably connected to the first section, and both wheels are fixed to their respective axles.

17. A stretcher or the like as set forth in claim 14, wherein the peripheral surfaces of the wheels include teeth.

18. A stretcher or the like as set forth in claim 14, wherein the tracks are toothed racks.

19. A stretcher or the like as set forth in claim 14, wherein each axle has a pair of wheels with pheripheral portions that engage peripheral portions of the other axle's wheels.

20. A stretcher or the like as set forth in claim 14, wherein there is a generally vertical jacking column independent of the two axles for raising and lowering the elevator.

21. A "central post" type elevator column having telescoping sections for connecting to a supporting top that is at least twice as large as the column's cross-sectional area, wherein the improvement comprises: a pair of stabilizing axles connected to a first intertelescoping section; at least one wheel on each axle, and such wheel has a peripheral portion that engages a peripheral portion of the wheel on the other axle causing both wheels to simultaneously rotate; and a pair of tracks, each track being secured along a major portion of its length to a second intertelescoping section so that the tracks can engage peripheral portions of the wheels, whereby cocking and binding between the two sections is prevented.

* * * * *